June 18, 1968   L. M. NASH   3,388,535
SELF-SUPPORTED FILTER
Filed Feb. 16, 1965

INVENTOR.
LAWRENCE M. NASH
BY
ATTORNEY

United States Patent Office 3,388,535
Patented June 18, 1968

3,388,535
SELF-SUPPORTED FILTER
Lawrence M. Nash, East Brunswick, N.J., assignor to Johnson & Johnson, a corporation of New Jersey
Filed Feb. 16, 1965, Ser. No. 433,130
6 Claims. (Cl. 55—492)

ABSTRACT OF THE DISCLOSURE

An improved self-supporting fibrous filter product comprising at least two layers of a fibrous material with a support frame between the layers. The frame comprises a peripheral portion and a second or inner portion. The layers are sealed together along the peripheral frame portion and at the inner portion.

---

This invention relates to an improved filter, and more particularly, to such a filter formed of permeable fibrous material with a stable internal self-supporting frame.

Most filters used in air conditioning apparatus, heating apparatus, and for other purposes are supported by a metal or cardboard frame extending about the edges of the filter and overlapping both the front and back edges of the filter. Some of these filters also have expanded metal grids or similar structures on one or both surfaces to support the filter. In some prior art filters, coarse screens have been embedded in the fibrous material for supporting the filter. However, in all of these prior art filters, the support material considerably reduces the effective area of the filter, sometimes even up to 20 percent of the effective area of the filter. Furthermore, when the edge-type supported filter is used in apparatus in which filters are butted edge to edge, there is left a gap or a space through which contaminated air readily passes.

The filter of the present invention eliminates these problems and is also simple to construct and very economical. The support for the filter of the present invention only slightly reduces the effective area of the filter. Furthermore, the filters of the present invention may be butted edge to edge with a tight seal thereby preventing contaminated air from passing between the edges of butted filters. Also the filters of the present invention do not buckle or bulge in the center portion of the filter during use.

In accordance with the present invention, my self-supported filter comprises at least two layers of a permeable fibrous filtering material and a support frame between the layers. The filtering layers are substantially the same size and shape and are disposed in face to face relationship with each other and preferably contact each other over substantially their entire face. The frame comprises two portions, both of which are disposed between the layers. The first of these portions extends adjacent substantially the entire periphery of the layers but is spaced slightly inward from this periphery. The second portion is disposed within the peripheral area formed by the first portion and its purpose is to prevent buckling. Hence, the actual position of this second portion may vary according to the size and shape of the final filter. For example, if a square filter is used, the second portion may be right in the center of the filter, whereas if a rectangular filter is used, two such supports might be used disposed equidistant from each other and from the edges of the filter. The layers are secured to each other and may be secured to the frame portions at that area which immediately surrounds the frame portions.

In accordance with the present invention, the layers of filter material are made from thermoplastic fibers, such as, polyester fibers, and are secured to each other by heat sealing along the outside of the first or peripheral frame portion and immediately adjacent thereto, and the layers are heat sealed to each other immediately adjacent a portion of the periphery of the second frame or inner frame portion.

Securing the layers together by heat sealing as described above holds the support in place and makes the filter stable during use. Also the heat sealing operation does not substantially reduce the effective filtering area of the filter. Furthermore, the heat seal lines add to the stability of the filter.

In many of the new highly efficient filters the fibrous material has been treated with a tacky or sticky substance to improve filtration. With such type filters an adhesive cannot be used to secure layers together as it just does not bind the tacky substance. However, in accordance with the present invention, the layers of my filter may be secured together by heat sealing without any interference by the tacky substance.

The invention will be more fully described in conjunction with the accompanying drawings in which.

Figure 1:
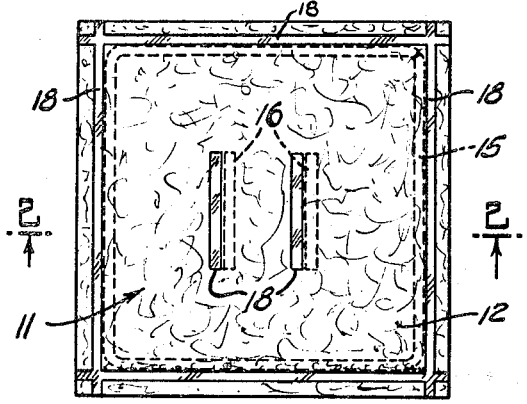
FIGURE 1 is a face view of one embodiment of the filter of the present invention.

Referring to the drawings, in FIGURE 1 there is shown a self-supported filter 11 of the present invention. As more clearly shown in FIGURE 2, the filter comprises two layers 12 and 13 of fibrous filtering material. Between these layers there is disposed a two part frame 15 and 16. The first part 15 extends about the periphery of the filter, and the second part 16 is disposed in the central portion of the filter. The layers of filtering material are sealed to each other 18 along the outer edge of the frame 15 and along a portion of the frame 16.

Figure 3:
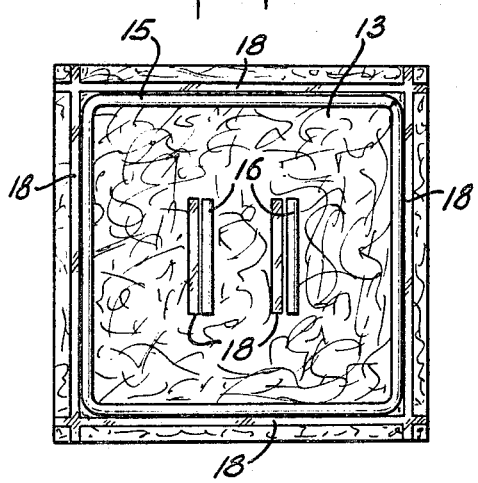
FIGURE 3 is a face view of the filter of FIGURE 1 with the outer layer of fibrous material removed.

In FIGURE 3 the upper layer 12 has been removed so that the exact positioning of the frame 15 as it lies on the lower filtering layer 13 is shown.

Figure 4:
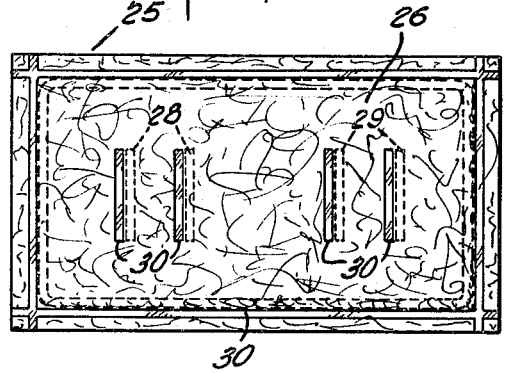
FIGURE 4 is a face view of another embodiment of the filter in accordance with the present invention.

In FIGURE 4 there is shown another embodiment of the filter of the present invention. In this figure there is shown a rectangular filter 25. The fibrous filtering material 26 is supported on a frame comprising three portions 27, 28 and 29. The first portion 27 extends about the periphery of the filtering material while the second and third portions 28 and 29 are disposed in the central portion of the filter and are spaced so as to prevent buckling of the filter during use. The layers are sealed 30 together along portions of all the frames.

The filtering material may be made from any of the various known thermoplastic fibers. Examples of such fibers would be acetate fibers, polyamide fibers, polyester fibers, etc.

The fibers are generally disposed in batt form by means well known in the art, such as, garnetting, carding, air-laying, water-laying, etc. If desired, the batt may be compressed so that the fibrous material is denser or thicker batts may be used which generally provide a more tortuous path for air flow. Generally the fibers lie in over-lapping, intersecting relationship, sometimes with very little orientation, other times with a reasonably high degree of orientation. When using batts having high fiber orientation, generally a number of these batts may be laid at angles to each other.

In a preferred embodiment of the present invention, the batt is treated with a tackifier or similar substance which maintains the batt tacky during use and makes the filtering medium more efficient. Preferred tackifiers would be the polybutenes, though many of the nonmigrating oils may also be used. It is also preferred that the tackifier only be placed on the downstream side of the filter media with the upstream side of the filter left free of such material. If desired, other additives, such as, bacteriostats, germicides, etc., may also be applied to the filtering materials of the present invention.

The filtering materials may be of various sizes and shapes depending upon the apparatus with which they are to be used. The filtering materials may be square, rectangular, circular, polysided, etc., and the exact size will, of course, depend upon the apparatus in which the filtering material is to be inserted.

A minimum of two batts having the same size and shape must be used in accordance with the present invention. At least one batt must be disposed on each side of the frame and encase or embed the frame. If desired, more batts may be used, and these may be disposed equally on both sides of the frame or more on one side of the frame than the other as desired.

The batts must be disposed in face to face relationship and between the batts is placed the self-supporting frame. The frame comprises two portions. The first portion extending substantially about the periphery of the batts, but spaced slightly therefrom. It is preferred that the spacing be between about one-half to one inch from each edge of the batt, though if desired, larger spaces of two to three inches or even more may be used. By leaving a portion of filter media extending past the first portion of the frame, the filters of the present invention may be butted to each other so as to form an excellent seal without any gap or spacing between filters. This full filter seal eliminates the possibility of contaminated air being passed through the apparatus without filtering.

Figure 2:
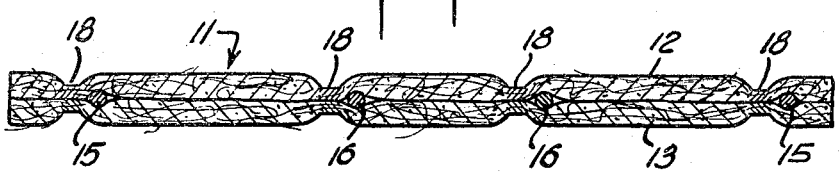
FIGURE 2 is an enlarged cross-sectional view taken along the line 2—2 of FIGURE 1.

The second portion of the frame is called the "center" portion. This portion will extend within the area formed by the first portion of the frame, and is necessary to prevent the center portion of the filter batts from buckling or bulging during use. The center portion may have virtually any size or shape and may be located as desired to prevent the buckling. For example, in the square filter two lines of frame may be spaced in the center of the material as depicted in FIGURE 1 or if a rectangular filter is being used, the center portion may be as shown in FIGURE 2.

The frame may be made of various material, such as, metal, plastic, etc. Suitable material is No. 9 gauge galvanized wire. It is important that the frame have a relatively small cross-sectional area so that it does not reduce, to any substantial amount, the amount of filtering area yet performs its support function. Also the frame should not be so large as to cause a bulge in the filtering material and increase the thickness of the filtering material at the portion where the filtering material is attached. As mentioned above, No. 9 gauge wire has been found suitable though thin plastic strips may also be used.

The batts with the frame therebetween are laminated together by sealing the batts along the outer edge of the first portion of the frame and along a portion of the second or center portion of the frame. This sealing may be accomplished by heat if thermoplastic fibers are used as the filtering material, or by solvent bonding along the frames, etc. In the preferred embodiment of the present invention, when the filter material is made from thermoplastic fibers, such as, the polyesters, it is preferred that the two batts be heat sealed about the outer portion of the first portion of the frame and heat sealed along a portion of the periphery of the central portion of the frame. When polyester fibers are used, the heat seal may be accomplished at temperatures from about 350° to 450° F. and pressures from about 60 to 100 pounds per square inch for short periods, say 15 seconds.

Although I have described certain preferred embodiments of my present invention in considerable detail, it is to be understood that the description is intended to be illustrative and not restrictive, as many details may be modified or changed without departing from the spirit or scope of the invention. Accordingly the invention is to be limited only by the appended claims viewed in light of the prior art.

What is claimed is:

1. A self-supported filter comprising at least two layers of a permeable thermoplastic fiber filter material, and a support frame between said layers, said layers being of substantially the same size and shape and being disposed in face to face relationship and said frame comprising a first portion extending adjacent substantially the entire periphery of said layers but spaced inwardly therefrom, and a second portion separate from said first portion and disposed within the area defined by said first portion to prevent the filter materials from buckling during use, said layers being heat sealed together only along the outer periphery of the first portion of said frame and spaced inwardly from the outer periphery of said layers and at the second portion of said frame, whereby the area available for filtration is not substantially changed and the periphery of said layers are unsecured.

2. A self-supported filter comprising at least two layers of a permeable polyester fiber filter material, and a support frame between said layers, said layers being of substantially the same size and shape and being disposed in face to face relationship and said frame comprising a first portion extending adjacent substantially the entire periphery of said layers but spaced inwardly therefrom, and a second portion separate from said first portion and disposed within the area defined by said first portion to prevent the filter materials from buckling during use, said layers being heat sealed together only along the outer periphery of the first portion of said frame and spaced inwardly from the periphery of said layers and at the second portion of said frame, whereby the area available for filtration is not substantially changed and the periphery of said layers are unsecured.

3. A self-supported filter comprising at least two layers of a permeable thermoplastic fiber filter material, one of said layers containing a tackifier, and a support frame between said layers, said layers being of substantially the same size and shape and being disposed in face to face relationship and said frame comprising a first portion extending adjacent substantially the entire periphery of said layers but spaced inwardly therefrom, and a second portion separate from said first portion and disposed within the area defined by said first portion to prevent the filter materials from buckling during use, said layers being heat sealed together only along the outer periphery of the first portion of said frame and spaced inwardly from the outer periphery of said layers and at the second portion of said frame, whereby the area available for filtration is not substantially changed and the periphery of said layers are unsecured.

4. A self-supported filter comprising at least two layers of a permeable polyester fiber filter material, one of said layers containing a tackifier, and a support frame between said layers, said layers being of substantially the same size and shape and being disposed in face to face relationship and said frame comprising a first portion extending adjacent substantially the entire periphery of said layers but spaced inwardly therefrom, and a second portion separate from said first portion and disposed within the area defined by said first portion to prevent the filter materials from buckling during use, said layers being heat sealed together only along the outer periphery of the first portion of said frame and spaced inwardly from the outer periphery of said layers and at the second portion of said frame, whereby the area available for filtration is not substantially changed and the periphery of said layers are unsecured.

5. A self-supported filter comprising at least two layers of a permeable thermoplastic fiber filter material, one of said layers containing a tackifier and one of said layers being free of tackifier, and a support frame between said layers, said layers being of substantially the same size and shape and being disposed in face to face relationship and said frame comprising a first portion extending adjacent substantially the entire periphery of said layers but spaced inwardly therefrom, and a second portion separate from said first portion and disposed within the area defined by said first portion to prevent the filter materials from buckling during use, said layers being heat sealed together only along the outer periphery of the first portion of said frame and spaced inwardly from the outer periphery of said layers and at the second portion of said frame, whereby the area available for filtration is not substantially changed and the periphery of said layers are unsecured.

6. A self-supported filter comprising at least two layers of a permeable polyester fiber filter material, one of said layers containing a tackifier and one of said layers being free of tackifier, and a support frame between said layers, said layers being of substantially the same size and shape and being disposed in face to face relationship and said frame comprising a first portion extending adjacent substantially the entire periphery of said layers but spaced inwardly therefrom, and a second portion separate from said first portion and disposed within the area defined by said first portion to prevent the filter materials from buckling during use, said layers being heat sealed together only along the outer periphery of the first portion of said frame and spaced inwardly from the outer periphery of said layers and at the second portion of said frame, whereby the area available for filtration is not substantially changed and the periphery of said layers are unsecured.

References Cited

UNITED STATES PATENTS

| | | | |
|---|---|---|---|
| 2,124,370 | 7/1938 | Gaarder | 55—492 |
| 2,138,736 | 11/1938 | Gaarder | 55—519 X |
| 2,521,984 | 9/1950 | Lang | 55—486 |
| 2,576,864 | 11/1951 | Valente | 210—491 |
| 2,751,039 | 6/1956 | Hanly | 55—524 |
| 2,865,466 | 12/1958 | Frohmader | 55—524 |
| 3,017,239 | 1/1962 | Rodman | 55 |
| 3,017,698 | 1/1962 | Hambrecht et al. | 55—501 X |
| 2,812,038 | 11/1957 | Krueger | 55—528 X |

FRANK W. LUTTER, *Primary Examiner.*

HARRY B. THORNTON, *Examiner.*

S. W. SOKOLOFF, *Assistant Examiner.*